United States Patent [19]

Miyata et al.

[11] 4,345,004
[45] Aug. 17, 1982

[54] PROCESS FOR FORMING A COATED FILM OF AN OLEFINIC RESIN

[75] Inventors: Nobuyoshi Miyata; Heihachi Murase, both of Hiratsuka, Japan

[73] Assignee: Hercules Incorporated, Wilmington, Del.

[21] Appl. No.: 255,663

[22] Filed: Apr. 20, 1981

[30] Foreign Application Priority Data

Apr. 30, 1980 [JP] Japan ................................. 55-56229

[51] Int. Cl.³ ........................ B32B 15/08; B32B 27/38
[52] U.S. Cl. .................................... 428/416; 156/330; 156/332; 156/333; 156/334; 204/181 T; 427/27; 427/185; 427/195; 427/386; 427/388.1; 427/388.2; 427/388.5; 428/36; 428/418; 428/516
[58] Field of Search ............... 156/330, 332, 333, 334; 428/416, 418, 461, 462, 463, 516, 413, 36; 427/410, 386, 388.1, 388.2, 388.3, 388.5, 195, 28, 27, 185, 331.8, 330.9, 208.8, 207.1; 204/181 T

[56] References Cited

U.S. PATENT DOCUMENTS 4,232,086 11/1980 Mori et al. ...................... 156/334 X
4,246,368 1/1981 Murase ............................... 525/117
4,312,902 1/1982 Murase et al. ...................... 427/386

Primary Examiner—Thurman K. Page
Attorney, Agent, or Firm—Robert C. Beam

[57] ABSTRACT

A process for forming an olefinic resin film on a metal substrate, which comprises

[A] forming a multilayer coated film consisting of an olefinic resin film as a surface layer portion and a cured epoxy resin film as an under layer portion on a metallic substrate by a single coating operation using a multilayer film-forming coating composition comprising as main resinous components
  (a) a solid powder containing an olefinic resin having a melt index of 0.3 to 80 g/10 minutes,
  (b) a solid powder containing a polar group-containing modified olefinic resin having a melt index of 0.3 to 80 g/10 minutes, and
  (c) a film-forming resinous material comprising an epoxy resin having a number average molecular weight of about 350 to about 4,000 and an epoxy equivalent of 150 to 3,800 and a curing agent therefor, and

[B] then heat-bonding an olefinic resin lining material to the olefinic resin surface layer of the multilayer coated film.

45 Claims, No Drawings

PROCESS FOR FORMING A COATED FILM OF AN OLEFINIC RESIN

This invention relates to a process for forming an olefinic resin coated film having excellent adhesion to a metal substrate. More specifically, this invention relates to a process for forming an olefinic resin lining on the surface of a metal substrate with a high adhesion strength, wherein as an intermediate adhesive layer, there is used a novel multilayer film-forming coating composition comprising as main resin components a solid powder containing an olefinic resin, a solid powder containing a polar group-containing modified olefinic resin, and a film-forming resinous material containing an epoxy resin.

Bituminous materials such as asphalt or coal tar enamel have long been used as exterior corrosion-resistant coatings for pipelines. Because of pollution problems and heavy degradation in anti-corrosive property with time, these materials have been gradually superseded by plastic materials having excellent corrosion resistance and durability. Olefinic resins such as polyethylene or polypropylene have attracted attention as anti-corrosive coating materials and gained commercial acceptance because of their chemical inertness, excellent mechanical properties, electrical properties, processability, corrosion resistance and durability. The olefinic resins, however, have the defect that their adhesion to metal surfaces is extremely poor. Attempts have been made to remedy this defect by, for example, using asphaltic or rubber tackifiers, or bonding an olefinic resin to a metal substrate through an adhesive of a modified polyolefin having introduced thereinto an adhesive functional group (e.g., a hydroxyl or carboxyl group). None of such methods have proved to be essentially satisfactory in regard to adhesion in a cold or hot condition, corrosion resistance, etc.

On the other hand, epoxy resin paints have excellent adhesion to metal substrates and good corrosion resistance, but it is difficult to form a superthick coating as is the case with olefinic resin lining materials.

Olefinic resins and epoxy resins have their own advantages and disadvantages as lining materials for metallic substrates such as pipelines, and attempts have been made to form a coated film from a combination of various resins by utilizing the advantages of the respective resins. For example, there has been proposed a method which comprises forming a cured coating of an epoxy resin having good corrosion resistance and excellent adhesion as a primer on the surface of the metallic substrate, and then forming an olefinic resin coating on the primer through a coating of the aforesaid modified polyolefin containing an adhesive functional group which scarcely gives rise to a problem of adhesion to the surface of the primer. Since, however, this method requires two or more coating operations, it has the defect that the procedure is complex and the cost of production increases.

As a means for avoiding this defect, there has been developed a so-called multilayer film-forming coating material which can be formed into a multilayer film composed of an epoxy resin coating as an under layer and an olefinic resin coating as a surface layer by a single coating operation. One example is a powder coating composition capable of forming a multilayer film, which is described in Japanese Patent Publication No. 14577/1978. A multilayer film is formed from this powder coating composition by utilizing the phase separation phenomenon between different kinds of polymer, and it is necessary that some differences in compatibility parameter, surface tension and multilayer film-forming parameter should exist between two or more coating resins. This Japanese Patent Publication describes various combinations of resins meeting these conditions, and a combination of an epoxy resin and an olefinic resin (particularly, polyethylene) is specifically exemplified. However, in order to form a multilayer coated film having the aforesaid properties using a powder coating composition comprising a combination of the epoxy resin and the olefinic resin, there is a limit in the blending proportion of the resins, the thickness of the multilayer coated film, etc. for proper formation of a multilayer coated film, and it is difficult to form a single coating operation a multilayer coated film having a surface layer portion of an olfinic resin coating with such a film thickness as to exhibit the desired mechanical properties, electrical properties, processability, durability, corrosion resistance, etc. Another defect is that the adhesion between the olefinic resin layer and the epoxy resin layer is not sufficient.

The present inventors took particular interest in the fact that the surface layer portion of a multilayer coated film composed of an epoxy resin (a under layer portion) and an olefinic resin (surface layer portion) and formed from the aforesaid multilayer film-forming coating composition is composed of a thermoplastic olefinic resin. Their investigations on the basis of this fact have led to the discovery that by re-melting the olefinic resin film of the surface layer portion and melt-bonding a lining layer of an olefinic resin having the desired thickness to the surface layer portion, there can be easily formed a coated film of the olefinic resin firmly bonded to a metallic substrate and having the desired film thickness, and that by incorporating a polar group-containing modified olefinic resin as a third component into the multilayer film-forming coating composition, there can be obtained a multilayer coated film in which the olefinic resin coating in the surface layer portion is firmly bonded to the epoxy resin coating in the under layer portion by the intermediary of the modified olefinic resin.

Thus, according to this invention, there is provided a process for forming an olefinic resin film on a metal substrate, which comprises

[A] forming a multilayer coated film consisting of an olefinic resin film as a surface layer portion and a cured epoxy resin film as an under layer portion on a metallic substrate by a single coating operation using a multilayer film-forming coating composition comprising as main resinous components (a) a solid powder containing an olefinic resin having a melt index of 0.3 to 80 g/10 minutes [to be referred to as a solid powder (a)], (b) a solid powder containing a polar group-containing modified olefinic resin having a melt index of 0.3 to 80 g/10 minutes [to be referred to as a solid powder (b)], and (c) a film-forming resinous material comprising an epoxy resin having a number average molecular weight of about 350 to about 4000 and an epoxy equivalent of 150 to 3800 and a curing agent therefor, and

[B] then melt-bonding an olefinic resin lining material to the olefinic resin surface layer of the multilayer coated film.

As stated above, in accordance with this invention, there is utilized a multilayer coated film composed of an epoxy resin (under layer portion) and an olefin resin (surface layer portion) which has excellent adhesion to a metallic substrate and to each other. According to the process of this invention, there can be easily formed a coated film of the desired film thickness which comprises an epoxy resin layer having excellent corrosion resistance and firmly bonded to a metallic substrate, an olefinic resin adhesive layer well adhering to the epoxy resin layer, and an olefinic resin lining material integrated in the molten state with the olefinic resin adhesive layer and which has excellent properties such as adhesion, corrosion resistance, mechanical properties, electrical properties and durability. The process for forming the olefinic resin coated film in accordance with this invention is described in detail below.

MULTILAYER FILM-FORMING COATING COMPOSITION

The multilayer film-forming coating composition used in this invention comprises the solid powder (a), the solid powder (b) and the resinous material (c) as main resinous components. When this coating composition is coated on the surface of a metallic substrate by a single operation and baked, there is formed a multilayer coated film in which a layer of a cured epoxy resin film is oriented to the metallic substrate side, i.e. as a under layer, and a layer of an olefinic resin layer, to a surface layer, through the polar group-containing modified olefinic resin. The multilayer film-forming coating composition may be in any desired form most suited depending upon the coating conditions, for example in the form of a powder coating composition composed of the solid powder (a), the solid powder (b) and the solid resinous material (c) in the powderized state; a complete slurry-type paint obtained by dispersing the solid powder (a), the solid powder (b) and the resinous material (c) in the powderized state in a poor solvent for all of these components; or a partial slurry-type paint obtained by dispersing and dissolving the solid powder (a), the solid powder (b) and the resinous material (c) in an organic compound which is a poor solvent for the olefinic resin and the modified olefinic resin but is a good solvent for the epoxy resin in the resinous material (c).

Solid powder (a)

The olefinic resin to be included in the solid powder (a) may be a homopolymer of olefin, a copolymer of two or more olefins with each other, and a mixture of such homopolymers or copolymers in arbitrary proportions. The olefins include not only those containing only one ethylenic double bond (monoolefins), but also those containing two or more ethylenic double bonds (diolefins, etc.), and examples are ethylene, propylene, butene, isobutylene, pentene, butadiene and isoprene.

Typical examples of the olefinic resins which can be used in the solid powder (a) include low-density, medium-density, and high-density polyethylenes, polypropylene, and an ethylene/propylene copolymer, the polyethylenes being especially preferred.

These olefinic resins may be used singly or in combination with each other. For example, by using low-density polyethylene and high-density polyethylene in combination, the surface hardness or flexibility of the resulting coated film can be adjusted.

It is essential that the olefinic resins used in this invention should have a melt index of 0.3 to 80 g/10 minutes, preferably 1.5 to 60 g/10 minutes. If the melt index of the olefinic resin is less than 0.3 g/10 minutes, the melt flowability of the coated film at the time of coating and baking of the coating composition is not sufficient, and formation of a multilayer coated film is hampered resulting in difficulty of obtaining a smooth coated film. On the other hand, if the melt index of the olefinic resin exceeds 80 g/10 minutes, the melt flowability of the coated film becomes excessively great, and it is difficult to secure a multilayer film with good interlayer adhesion, and the properties of the coated film may be poor.

The solid powder (a) used in accordance with this invention may be composed substantially solely of the olefinic resin, or may further contain a coloring pigment (such as titanium dioxide, carbon black, iron oxide, aluminum powder and phthalocyanine blue), an extender pigment (such as calcium carbonate, barium sulfate, talc and clay), a rustproof pigment (such as red lead, basic lead chromate, zinc chromate, zinc molybdate, aluminum phosphate, and zinc powder), a reinforcing filler (such as asbestos, glass flakes, and glass fibers), etc. It may further include additives usually employed in powder coating compositions, such as dispersants, ultraviolet absorbers, flow control agents, and thixotropic agents. Inclusion of such additives makes it possible to produce such effects as coloration of the solid powder (a), improvement of its mechanical, chemical and electrical properties, and cost reduction.

Powderization of the olefinic resin can be performed by using methods known per se, for example by a chemical pulverization method comprising jetting a solution containing the olefinic resin into a poor solvent to precipitate it in powder form, and a mechanical pulverization method comprising pulverizing it at extremely low temperatures. Desirably, the above-exemplified additives are kneaded and dispersed in the olefinic resin before the powderization opertion. The amounts of the additives are not critical. Generally, the amounts may be up to 150% by weight, preferably up to 120% by weight, based on the weight of the olefinic resin.

The particle size of the solid powder (a) is not strictly limited, and can be varied widely depending upon the type of the resin used in the solid powder (a), etc. If the particle size is too large, a thin smooth film cannot be obtained. Advantageously, therefore, the solid powder (a) has an average particle diameter of generally not more than 74 μm, preferably not more than 44 μm. On the other hand, if the particle size is too small, dust explosion or a hygienic trouble may occur. Hence, the lower limit is desirably 10 μm.

Solid powder (b)

The polar group-containing modified olefinic resin used in the solid powder (b) is a resin obtained by introducing a polar group into an olefinic resin by some suitable methods. Such a resin includes, for example, a copolymer of at least one olefin exemplified with regard to the solid powder (a) and another copolymerizable polar group-containing vinyl monomer, resins obtained by graft polymerizing a polar group-containing vinyl monomer with the olefinic resins exemplified hereinabove with regard to the solid powder (a), or resins obtained by introducing polar groups by such means as halogenation, chlorosulfonation, sulfonation and ozone oxidation.

The "polar group" which can be included in the modified olefinic resin includes, for example, atoms or atomic groupings which have good affinity for an epoxy resin contained in the resinous material (c) described below, and are composed of hetero atoms such as oxygen, nitrogen, sulfur and halogen atoms, especially chlorine and fluorine atoms; and atomic groups containing these hetero atoms, such as a hydroxyl group (—OH), an oxo group (=O), a carbonyl group (>C=O), a carboxyl group (—COOH), carboxylate ester groups (—COOR in which R is preferably a lower alkyl group), a carboxylic acid anhydride group

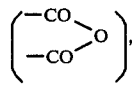

a sulfonyl group (—SO$_2$), a sulfo group (—SO$_3$H), a nitrile group (—CN), and an amide group (—CON<). These polar groups may be existent singly or in combination with each other. The content of the polar group may vary depending upon the type of the polar group, etc. If the content of the polar group is too large, formation of a multilayer coated film will be hampered. If, on the other hand, it is too small, a sulfficient adhesion between the olefinic resin surface layer and the epoxy resin under layer cannot be obtained. Generally, the content of the polar group is desirably such that the surface tension of the polar group-containing modified olefinic resin during heat-melting is higher than that of the olefinic resin in the solid powder (a) during heat melting and lower than that of the resin material (c) during heat melting. It is not easy to set a definite range of the content of the polar group. Roughly speaking, however, the suitable content of the polar group, calculated as the content of hetero atoms contained therein, is generally 0.2 to 15% by weight, preferably 0.5 to 5% by weight, based on the weight of the modified olefinic resin.

Especially suitable polar groups in the practice of this invention are a carboxyl group and a carboxylic acid anhydride group, and these groups are included desirably in an amount of generally 0.05 to 2.5 moles, preferably 0.1 to 1.5 moles, per 1000 g of the modified olefinic resin.

In preparing such a polar group-containing modified olefinic resin, there can be used polar group-containing vinyl monomers for copolymerization with an olefin or for graft-polymerization with an olefinic resin. Examples of the polar group-containing vinyl monomers include vinyl esters of organic acids such as vinyl acetate and vinyl propionate; unsaturated carboxylic acids and the anhydrides or esters thereof, such as acrylic acid, methacrylic acid, methyl acrylate, ethyl acrylate, propyl acrylate, n-butyl acrylate, isobutyl acrylate, 2-ethylhexyl acrylate, methyl methacrylate, ethyl methacrylate, n-propyl methacrylate, isopropyl methacrylate, n-butyl methacrylate, 2-ethylhexyl methacrylate, maleic acid, and maleic anhydride; and other polar vinyl monomers such as acrylonitrile, methacrylonitrile, allyl vinyl ether, vinyl chloride and vinylidene chloride.

Typical examples of the polar group-containing modified olefinic resin that can be used in the solid powder (b) include an ethylene/vinyl acetate copolymer, an ethylene/acrylic acid copolymer, fluorinated polyethylene, chlorinated polyethylene, chlorosulfonated polyethylene, sulfonated polyethylene, polyethylene treated with ozone oxidation, maleic anhydride-grafted polyethylene, acrylic acid-grafted polyethylene, acrylonitrile-grafted polyethylene, and acrylamide-grafted polyethylene. Especially preferred are the ethylene/vinyl acetate copolymer, ethylene/acrylic acid copolymer, polyethylene oxidized with ozone, maleic anhydride-grafted polyethylene, and acrylic acid-grafted polyethylene.

When the modified olefinic resin is a polymer containing units derived from the aforesaid organic acid vinyl ester or unsaturated carboxylic acid ester, it may, if desired, be saponified to convert the ester group to a polar group such as a carboxyl or hydroxyl group before it is used in preparing the solid powder (b).

These polar group-containing modified olefinic resins may be used singly or, if required, as a blend of two or more.

The polar group-containing modified olefinic resin should also have a melt index of 0.3 to 80 g/10 minutes, preferably 1.5 to 60 g/10 minutes, which is desirably larger than the melt index of the olefinic resin used in the solid powder (a).

The solid powder (b) used in accordance with this invention may consist substantially solely of the aforesaid polar group-containing modified olefinic resin, or may further contain additives such as coloring agents, extender pigments, rustproof pigments, reinforcing fillers, dispersants, ultraviolet absorbers, flow control agents and thixotropic agents.

Powderization of the polar group-containing olefinic resin may be performed by methods known per se, for example by a chemical pulverization method comprising jetting a solution containing the modified olefinic resin into a poor solvent to precipitate it in powder form, or a mechanical pulverization method comprising pulverizing it at extremely low temperatures. Desirably, the aforesaid additives are kneaded and dispersed in the modified olefinic resin before the pulverization operation. The amounts of these additives are not critical, but desirably, the amounts are up to 150% by weight, preferably up to 120% by weight, based on the weight of the modified olefinic resin.

The particle diameter of the solid powder (b) is not strictly limited, and can be varied widely depending upon the type of the resin used in the solid powder (b), etc. If the particle size is too large, a thin smooth film cannot be obtained. Advantageously, therefore, the solid powder (b) has an average particle diameter of generally not more than 74 μm, preferably not more than 44 μm. On the other hand, if the particle size is too small, dust explosion or a hygienic trouble may occur. Hence, the lower limit is desirably 10 μm.

Resinous Material (c)

The epoxy resin constituting the resinous material (c) is an epoxy resin which is solid or liquid at room temperature and has a number average molecular weight of generally about 350 to about 4,000, preferably about 900 to about 3,000 and an epoxy equivalent of 150 to 3,800, preferably 450 to 2,100.

The epoxy resin may be soluble or insoluble in, or swellable with, dispersing media to be described below. If, however, an epoxy resin substantially insoluble in a dispersing medium is used, the type of the epoxy resin to be contained in the resinous material (c) is limited because the resinous material (c) should be dispersed in powder form in the dispersing medium. In this case, therefore, there are advantageously used epoxy resins which are solid at room temperature and have a number average molecular weight of generally about 700 to about 4,000, preferably about 900 to about 3,000, and an epoxy equivalent of generally 150 to 3,300, preferably 450 to 2,100.

If the number average molecular weight of the epoxy resin is less than about 350, the flowability of a molten curing agent after evaporation of the solvent from the resulting coated film generally becomes excessively high, a multilayer film having good interlayer adhesion cannot be sufficiently formed, and the resulting coated film tends to sag. On the other hand, if the number average molecular weight of the epoxy resin exceeds about 4,000, the flowability of the molten coated film is insufficient, and it is difficult to obtain a smooth film or a film in which the epoxy resin layer has an excellent ability to hide the substrate. If the epoxy equivalent of the epoxy resin is less than 150, the crosslinking density of the cured film becomes excessively high, and its adhesion to a metallic substrate may be reduced owing to an internal strain, and the coated film tends to become brittle. If it exceeds 3,800, the crosslinking density becomes too low, and there is a tendency toward degradation in the strength, water resistance, chemical resistance, etc. of the coated film.

In view of the mechanical properties of cured coated films, the adhesion of the films to metallic substrate, the corrosion resistance of the films, etc., suitable epoxy resins for use in the resinous materials (c) are, for example, epoxy resins of the polyhydric phenol (for example, bisphenol)-epihalohydrin condensate type, epoxy resins of the phenol/formaldehyde condensate type, and epoxy resins of the polymerized fatty acid type. Examples of the epoxy resins of the polyhydric phenol-/epihalohydrin condensate type include condensation products between bisphenol A, bisphenol F or halogenated bisphenol A and epichlorohydrin (such as EPIKOTE 828, EPIKOTE 1001, EPIKOTE 1002, EPIKOTE 1004, EPIKOTE 1007, and EPIKOTE 1009, made by Shell Chemical Co.). Examples of the epoxy resins of the phenol/formaldehyde condensate type are glycidyl ethers of novolak-type epoxy resins (such as EPIKOTE 152 and EPIKOTE 154 made by Shell Chemical Co.). Examples of the epoxy resins of the polymerized fatty acid type are dimeric acid-type epoxy resins (such as EPIKOTE 872 made by Shell Chemical Co.). In the present invention, the epoxy resins of the polyhydric phenol-epihalohydrin condensate type are especially suitable. These epoxy resins may be used singly or in combination with each other.

Suitable curing agents used to cure these epoxy resins are advantageously those which do not substantially react with the epoxy resins during manufacture and storage of resin compositions to be described below and react substantially and rapidly with the epoxy resins only under film-baking conditions to be described below. These curing agents include, for example, polycarboxylic acids and the anhydrides thereof (such as adipic acid, sebacic acid, phthalic acid, trimellitic acid, maleic anhydride, phthalic anhydride, trimellitic anhydride, itaconic anhydride, tetrahydrophthalic anhydride and pyromellitic anhydride), carboxylic acid amides (such as an addition product of dimeric acid with triethylenetetramine), methylolated melamines (such as methyletherified hexamethylolmelamine), blocked isocyanates (such as ε-caprolactam-blocked isophorone diisocyanate, and cresol-blocked tolylene diisocyanate-trimethylolpropane adduct), dicyandiamide and its derivatives (such as 2,6-xylenyl biguanide), carboxylic acid dihydrazides (such as adipic acid dihydrazide), imidazoline, imidazole, and salts of imidazoline or imidazole. The dicyandiamides, carboxylic acid dihydrazides and imidazoline salts are especially preferred. These curing agents may be used singly or in combination with each other.

The amount of the curing agent can be varied widely depending upon the type of the epoxy resin and/or the curing agent used. In view of the mechanical properties, water resistance, corrosion resistance, etc. required of the coated film, the suitable amount of the curing agent is at least 0.7 equivalent, preferably 0.8 to 1.2 equivalents, per epoxy group in the epoxy resin to be cured.

As required, the epoxy resin may also include additives such as coloring pigments, extender pigments, rust-inhibiting pigments, reinforcing fillers, dispersing agents, ultraviolet absorbers, flow control agents, and thixotropic agents as in the case of the solid powders (a) and (b). The amounts of the additives may be 0 to 150% by weight, preferably 0 to 120% by weight, based on the total amount of the epoxy resin and the curing agent.

When the multilayer film-forming coating composition is to be prepared in powder form or as a complete slurry, the resinous material (c) from the epoxy resin, the curing agents, etc. may be prepared by using similar techniques to those used in the production of ordinary epoxy powder coating compositions. For example, it can be accomplished by a combination of a hot roll or an extruder and an ordinary chemical or mechanical pulverization or dispersing means, or by a solvent-substitution method. The suitable particle diameter of the resinous material at this time is the same as in the solid powder (a) or (b), and the average particle diameter of the resinous material (c) is generally not more than 74 $\mu$m, preferably not more than 44 $\mu$m and at least 10 $\mu$m.

When the multilayer film-forming coating composition is to be prepared in a partial slurry, the resinous material (c) may be prepared by dissolving the epoxy resin, the curing agent, etc. in a good solvent for the epoxy resin, and dispersing them in the solvent in the same way as in the preparation of ordinary solvent-base paints, for example by using a ball mill, a roll mill or a sand mill.

Dispersing Medium

No dispersing medium is required when the coating composition of this invention is obtained as a powder composition. When it is a complete or partial slurry, volatile organic solvents should be used as dispersing media. Such an organic solvent may be a volatile organic liquid which containing at least 90%, preferably at least 95%, of a poor solvent for the solid powders (a) and (b). The term "poor solvent", as used herein, denotes a solvent which does not substantially dissolve and/or swell the olefinic resin in the solid powder (a) and the modified olefinic resin in the solid powder (b). More specifically, the "poor solvent" is such a solvent that when a powder of the aforesaid resin is dipped therein at room temperature for 1 week, then the poor solvent is evaporated, and the surface of the resulting powder is observed microscopically, no deformation due to fusion or swelling is noted in the particles.

The organic solvent mentioned above may be a poor solvent or a good solvent for the epoxy resin in the resinous material (c). When the organic solvent is a poor solvent for the resinous material (c), the resulting coating composition is a partial slurry. The partial slurry is advantageous over a complete slurry in that it permits easy adjustment of viscosity, and the metallic substrate can be completely hidden by the epoxy resin. On the other hand, however, it has the disadvantage that evaporation of the solvent is slow, and film defects are liable to occur when the coating composition is applied in a large film thickness. Accordingly, the partial and complete slurries should be selected according to the intended uses.

Suitable poor solvents are generally nonpolar organic liquids, especially hydrocarbons, although they differ depending upon the types of the solid powder (a), the solid powder (b) and the resinous material (c). Specific examples of such nonpolar organic liquids include aliphatic hydrocarbons, for example alkanes having 5 to 16 carbon atoms such as n-pentane, n-hexane, iso-hexane, n-heptane, n-octane, iso-octane, n-decane, n-dodecane, n-hexadecane and 2,2-dimethylbutane, and alkenes having 5 to 16 carbon atoms such as 1-pentene, 1-octene, 1-decene, 1-dodecene and 1-hexadecene; alicyclic hydrocarbons having 6 to 12 carbon atoms such as cyclohexane, methylcyclohexane, dimethylcyclohexane, ethylcyclohexane and methylisoamylcyclohexane; and mixed hydrocarbons such as petroleum ether, petroleum benzin, gasoline, kerosene, petroleum spirits and petroleum naphtha.

Thermodynamically, these nonpolar poor solvents, in view of their properties, cannot easily dissolve epoxy resins. Accordingly, these dispersing media can be used to prepare a coating composition in the form of a complete slurry in which the solid powders (a) and (b) and the resinous material (c) are all dispersed therein without dissolving.

Solvents which are poor solvents for the solid powders (a) and (b) but are good solvents for the resinous material (c) are generally highly polar solvents. Examples of such highly polar solvents include esters such as methyl acetate, ethyl acetate, isopropyl acetate and n-butyl acetate; ketones such as acetone, methyl ethyl ketone, methyl isobutyl ketone, cyclohexanone and isophorone; and ethers such as methyl Cellosolve, ethyl Cellosolve, butyl Cellosolve and Cellosolve acetate. These solvents may be used singly or as a mixture of two or more. Many of these good solvents for the resinous material (c) do not substantially swell or dissolve the solid powders (a) and (b). Accordingly, those which are poor solvents for the solid powders (a) and (b) may be singly used as a dispersing medium.

Alcohols and aromatic hydrocarbons may be used as auxiliary solvents or diluting solvents when the epoxy resin is to be used in the dissolved state. Examples of such alcohols are methanol, ethanol, propanol, butanol and amyl alcohol. Examples of the aromatic hydrocarbons are benzene, toluene, xylene and ethylbenzene.

Preparation of a Coating Composition

The coating composition used in the process of this invention can be prepared in the following manner by using the solid powders (a) and (b), the resinous material (c) and if required, a dispersing medium.

The coating composition in the form of a powder can be produced by uniformly mixing the fine powders of the individual components. Mixing can be performed by methods known per se, for example by using a Henschel mixer. On the other hand, when preparing a coating composition in the form of a complete or partial slurry, the solid powder (a), the solid powder (b), the resinous material (c), and other necessary ingredients are dispersed in a volatile organic solvent of the type exemplified hereinabove, or dispersed and partially dissolved therein. To prepare the complete slurry, it is desirable to powderize all of the solid powder (a), the solid powder (b) and the resinous material (c) before preparation. In order to obtain a partial slurry, it is convenient to prepare a solution of the resinous material (c) in advance using a part or the whole of the organic solvent in the final composition. The dispersing or dissolving itself can be carried out by a method known per se, for example by using a homogenizer or the like.

In preparing the coating composition, one kind each of the solid powder (a), the solid powder (b) and the resinous material (c) can be used, and if desired, two or more kinds each of the solid powder (a), and/or solid powder (b) and/or resinous material (c) may be used.

The proportions of the solid powder (a), the solid powder (b) and the resinous material (c) are not critical, and can be varied over a wide range. If the sum of the true volumes of the solid powder (a) and (b) is excessively smaller than the true volume of the resinous material (c), the olefinic resin layer as the surface layer does not easily form a continuous film, and the chemically inert under layer of the epoxy resin is exposed to the surface here and there, causing a degradation in various properties. Conversely, if it is much larger than the true volume of the resinous material (c), hiding of the metallic substrate by the epoxy resin layer is incomplete, and the olefinic resin layer partly makes contact with the metallic substrate, with the result that the adhesion or corrosion resistance of the coated film tends to be impaired.

It is desirable therefore that the sum of the true volumes of the solid powder (a) and the solid powder (b) is from 5% to 300%, preferably from 20% to 200%, of the true volume of the resinous material (c).

The term "true volume", used herein with regard to the solid powder (a), the solid powder (b) and the resinous material (c), denotes the volume of a solid powder excluding spaces existing among the individual particles when the powder is most closely packed. When the resinous material (c) is in the form of a solution, it denotes the volume of the resinous component remaining after removal of the solvent.

Desirably, the solid powder (b) is mixed in a specified ratio to the solid powder (a). Generally, it is very advantageous that the mixing is performed such that the true volume of the solid power powder (b) is 1 to 30%, preferably 3 to 20%, based on the true volume of the solid powder (a).

In preparing a coating composition of the complete slurry type or partial slurry type, the proportion of the dispersing medium based on the solid powder (a), the solid powder (b) and the resinous material (c) is not critical, and can be varied widely by considering the coatability of the coating composition, etc. Generally, it is advantageous that the proportion of the dispersing medium is 50 to 300 parts by weight, preferably 80 to 200 parts by weight, more preferably 100 to 180 parts by weight, per 100 parts by weight of the solid powder (a), the solid powder (b) and the resinous material (c) combined.

The coating composition so prepared is coated as an intermediate adhesive layer on the surface of a metal substrate when it is desired to form a thick coated film of an olefinic resin on the surface of such a metallic substrate as steel pipes, tanks and general steel structures.

Formation of a Multilayer Coated Film

Coating of the aforesaid multilayer filmforming coating composition on such metallic substrates does not require any special method, and may be carried out by ordinary methods such as air spraying, airless spraying, electrostatic coating, dipping, fluidized bed coating, and roll coating. Advantageously, the total thickness of the coated film after drying and baking is 30 to 250 microns, preferably 50 to 200 microns, and the surface layer of the olefinic resin has a thickness of 30 to 150 microns, preferably 30 to 120 microns in the total thickness.

The coated film may be dried and baked by ordinary methods, for example by using a hot air dryer, an infrared ray oven, an electromagnetic induction heater, etc. Generally, it is sufficient that the baking is carried out at a temperature of about 150° to about 250° C. for about 5 to about 40 minutes. Thus, there is formed a multilayer coated film having excellent interlayer adhesion both between the metallic substrate and the cured epoxy resin under layer and between the epoxy resin under layer and the olefinic resin surface layer.

It has also been found in accordance with this invention that when in the formation of the multilayer film, the surface of a metallic substrate is pre-treated with a solution of at least one certain onium compound before the coating composition is applied to the surface of the metallic substrate, phase separation between the epoxy resin under layer and the olefinic resin surface layer and the adhesion of the epoxy resin under layer to a metallic substrate are greatly improved and there is formed a multilayer coated film having improved surface smoothness in which the epoxy resin under layer and the olefinic resin surface layer are more firmly bonded to each other.

Examples of onium compounds which exhibit such excellent ability are compounds of the following formulae (I) and (II).

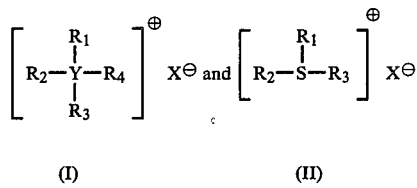

(I)         (II)

wherein Y represents a nitrogen, phosphorus or arsenic atom, $R_1$, $R_2$, $R_3$ and $R_4$ are identical or different and each represents a hydrogen atom or an organic group having not more than 8 carbon atoms, and $X^\ominus$ represents an anion.

In formulae (I) and (II) above, the organic group for $R_1$, $R_2$, $R_3$ and $R_4$ may be any organic group which does not substantially hamper the ionization of the onium compounds and does not adversely affect the affinity of the onium compounds for the substrate surface. The organic group generally includes hydrocarbon groups having not more than 8 carbon atoms, preferably not more than 7 carbon atoms, which may contain a hetero atom such as an oxygen atom in the form of the hydroxyl group, alkoxy group (i.e., etheric oxygen), etc., and/or may be substituted by a halogen atom. Thus, the organic group may be a hydrocarbon group having not more than 8 carbon atoms, preferably not more than 7 carbon atoms, which may optionally contain at least one, preferably 1 to 3, more preferably only one, hetero atom selected from hydroxylic and etheric oxygen atoms and halogen atoms. Such hydrocarbon groups include aliphatic, alicyclic and aromatic hydrocarbon groups such as alkyl, cycloalkyl, cycloalkyl-alkyl, aryl and aralkyl groups. The alkyl groups may be linear or branched, and desirably have 1 to 6 carbon atoms, such as methyl, ethyl, n- or iso-propyl, n-, iso-, sec- or tert-butyl, pentyl, heptyl, and octyl. The cycloalkyl and cycloalkyl-alkyl groups are preferably those having 5 to 8 carbon atoms such as cyclopentyl, cyclohexyl, cyclohexylmethyl, and cyclohexylethyl. Examples of the aryl groups include phenyl, tolyl, and xylyl, the phenyl group being preferred. Examples of the aralkyl groups are benzyl and phenethyl groups, the benzyl group being preferred.

Preferred examples of the hydrocarbon group containing a hetero atom selected from hydroxylic and etheric oxygen atoms and halogen atoms include $C_1-C_8$ hydroxyalkyl groups (especially hydroxy lower alkyl groups) such as hydroxymethyl, hydroxyethyl, hydroxybutyl, hydroxypentyl, hydroxyheptyl and hydroxyoctyl; $C_2-C_8$ alkoxyalkyl groups (especially lower alkoxy lower alkyl groups) such as methoxymethyl, methoxyethyl, ethoxymethyl, n-propoxyethyl, iso-propoxymethyl, n-butoxymethyl, iso-butoxyethyl, and tert-butoxyethyl; and $C_1-C_6$ alkyl groups such as chloromethyl, chloroethyl, chloropropane, chloropentane, bromoethyl and bromopropane.

Examples of the anion $X^\ominus$ are inorganic acid radicals such as $PO_4^{3\ominus}$, $HPO_4^{2\ominus}$, $H_2PO_4^\ominus$, halogen ions (e.g., $Cl^\ominus$, $Br^\ominus$, $I^\ominus$), $SO_4^{2\ominus}$, $HSO_4^\ominus$ and $NO_3^\ominus$ hydroxyl ion ($OH^\ominus$); and organic acid radicals such as $CH_3COO^\ominus$, $C_2H_5COO^\ominus$, $CH_3CH(OH)COO^\ominus$, and $C_6H_5SO_3^\ominus$.

The term "lower" used in the present application to qualify groups or compounds means that groups and compounds so qualified have not more than 6 carbon atoms, especially not more than 4 carbon atoms.

Typical examples of the onium compounds of formulae (I) and (II) are listed below.

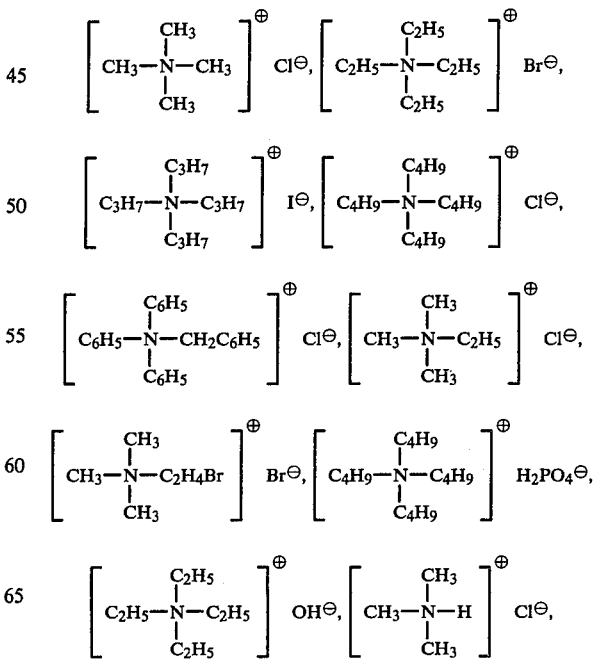

-continued

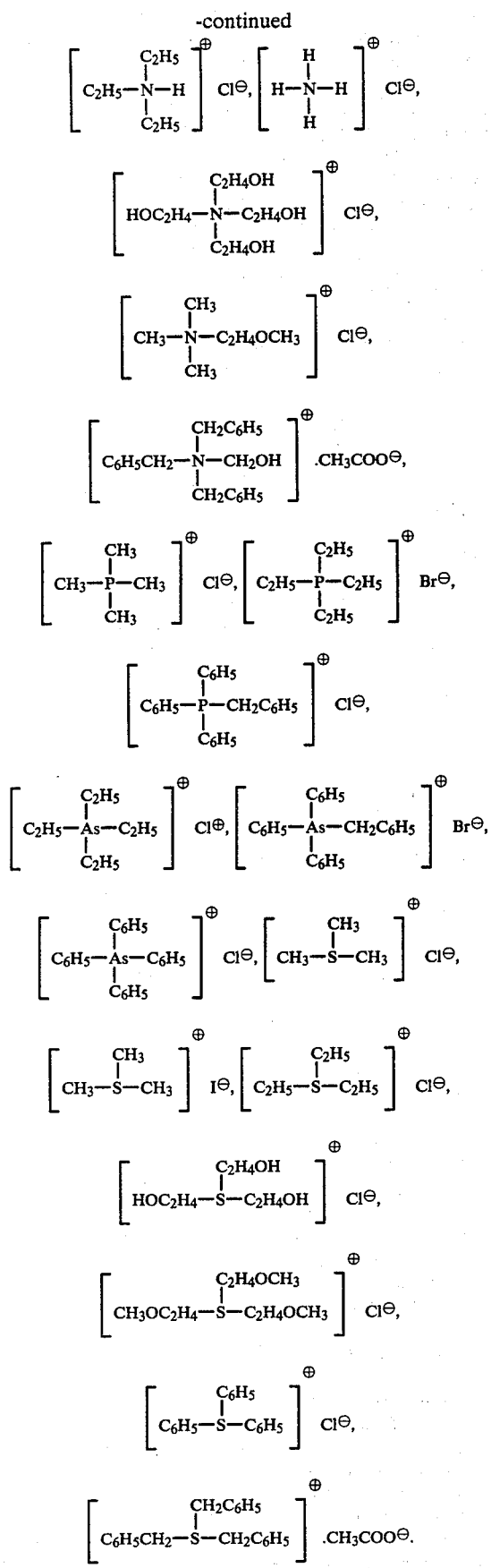

These onium compounds can be used either singly or in combination with each other.

Since the onium compound has the property of imparting thermodynamic affinity between the substrate surface and the under layer component of the multilayer film-forming coating composition, even a very small amount of a thin film, one to several molecules thick, of the onium compound can exert a great action on the formation of the multilayer coated film. The action of the alkyl groups as substituents $R_1$ to $R_4$ is the greatest with lower alkyl groups, especially methyl, and tends to become progressively weak as the number of carbon atoms of the alkyl groups increases. The effect is large in the case of aryl and aralkyl groups such as a phenyl or benzyl group. Accordingly, the substituents $R_1$ to $R_4$ are preferably $C_1$-$C_4$ alkyl groups, $C_1$-$C_4$ hydroxyalkyl groups, $C_2$-$C_4$ alkoxyalkyl groups, $C_1$-$C_4$ haloalkyl groups, a phenyl group and a benzyl group.

As regards the central elements of the onium compounds, a nitrogen atom and a phosphorus atom, perticularly a phosphorus atom are especially suitable, and arsenic and sulfur atoms seem to decrease slightly in effect.

As regards the anions $X^\ominus$, halogen ions, especially chlorine ion, are most suitable, and next come a bromine ion and an iodine ion.

A preferred group of onium compounds for use in this invention, therefore, includes ammonium and phosphonium compounds of the following formula

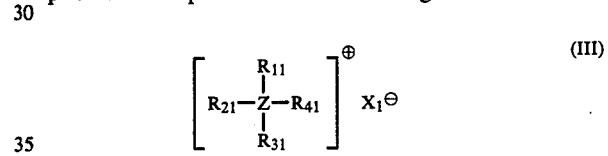

(III)

wherein Z represents a nitrogen or phosphorus atom, particularly a phosphorus atom, $R_{11}$, $R_{21}$, $R_{31}$ and $R_{41}$ are identical or different, and each represents a lower alkyl group having 1 to 4 carbon atoms (especially a methyl or ethyl group), a hydroxyalkyl group having 1 to 4 carbon atoms, an alkoxyalkyl group having 2 to 4 carbon atoms, a haloalkyl group having 1 to 4 carbon atoms, a phenyl group or a benzyl group, and $X_1^\ominus$ represents a halogen ion, especially $Cl^\ominus$, $Br^\ominus$ or $I^\ominus$.

In treating the surface of a metal substrate, the onium compound is applied from its solution.

Since the onium compound is generally watersoluble, it can be used as an aqueous solution. Any other solvent which is capable of dissolving the onium compound may be used because a multilayer film-forming coating composition is usually applied after the pre-treating onium compound coating has been dried up, and the type of the solvent of the pre-treating solution does not affect the film formability of the multilayer film-forming coating composition. An organic solvent can thus be used in order to improve the drying property of the pre-treating solution or the wettability of the substrate surface, and a mixture of water and a water-miscible organic solvent may also be used. Examples of the organic solvent that can be used include ketones such as acetone, methyl ethyl ketone and methyl isobutyl ketone, alcohols such as methanol, ethanol and isopropanol, esters such as methyl acetate, ethyl acetate and isopropyl acetate, and high-boiling solvents such as ethylene glycol monoethyl ether and ethylene glycol monoethyl ether acetate. These solvents may be used singly or as a mixture with each other. Or at least one of them may be used in combination with water. Which solvent or solvent mixture is to be used is determined by considering the solubility of the onium compound, the wettability of the substrate surface, the drying property of the onium compound, the risk of ignition of the solvent and its effect on the working environment, etc.

The concentration of the onium compound in the solvent is not critical. It is generally 0.01 to 30% by weight, preferably 0.3 to 5% by weight. If the concentration of the onium compound is less than 0.01% by weight, the pre-treating effect is generally reduced, and the under layer component cannot completely cover the surface of the substrate. If, on the other hand, it exceeds 30% by weight, the pre-treating solution of the onium compound becomes viscous, and its coatability is reduced. Moreover, its drying property is aggravated.

Application of the pre-treating solution so prepared containing at least one such onium compound can be effected by known coating methods such as spray coating, brush coating, roller coating and dip coating. The amount of the pre-treating solution differs depending upon the type or concentration of the onium compound used. Advantageously, it is generally about 0.001 to about 1.5 g/m$^2$, preferably about 0.01 to about 0.5 g/m$^2$, calculated as the weight of the onium compound in the pre-treating solution.

Drying of the coated pre-treating solution may be effected at room temperature or at an elevated temperature. It is only sufficient to evaporate the solvent. When the pre-treating solution has a high content of water, its evaporation is slow, and generally the drying is carried out at an elevated temperature. Suitably, the drying is carried out in a heated oven through which hot air is circulated. The drying temperature is desirably set at 50° to 140° C.

The drying time is not specifically limited because the ultimate purpose is to evaporate the solvent. In the case of drying at room temperature, the sufficient drying time is 5 to 15 minutes, and at 100° C., a period of 2 to 3 minutes is sufficient.

If desired, about 0.1 to about 3 parts by weight of a mono-, di- or tri-(hydroxy lower alkyl) amine such as monoethanolamine, diethanolamine, triethanolamine or about 0.05 to about 0.2 part of phosphoric acid, per 100 parts by weight of the treating solution, may be added to the pre-treating solution of the onium compound. This improves corrosion resistance.

A multilayer film-forming coating composition is then coated on the substrate surface which has been pre-treated with the onium compound solution in the manner described hereinabove.

Lining of an olefinic resin

Since the surface layer portion of the resulting multilayer coated film of a cured epoxy resin and olefinic resin is a thermoplastic olefinic resin, an olefinic resin is a thermoplastic olefinic resin, an olefinic resin is further melt-bonded to the surface layer portion while it is still in the molten state by the retained heat of the baking operation or after the multilayer coated film is cooled and re-heated to render it softened or molten. As a result, there is formed a coated film of the olefinic resin, the whole of which is integrally adheres closely to the metallic substrate. Thus, a lining of an olefinic resin having good adhesion to the metallic substrate can be formed.

The olefinic resin lining material to be hot melt-adhered in accordance with the present invention includes, for example, homopolymers or copolymers of olefins such as ethylene, propylene, butylene, isobutylene, pentene, butadiene and isoprene; copolymers of these olefins with polar group-containing vinyl monomers of the types exemplified hereinabove (e.g., vinyl acetate, acrylic acid, and tetrafluoroethylene) having an olefin content of at least 75% by weight, which are known as olefinic resin lining materials. Typical examples of the olefinic resin lining materials are polyethylene (low, medium or high density), polypropylene, an ethylene/propylene copolymer, an ethylene/vinyl acetate copolymer, and a metallic ion crosslinked ethylene/acrylic copolymer ("Surlyn", a trademark for a product of E. I. du Pont de Nemours & Co.), and polyethylene is especially preferred. These olefinic resins may be used singly or as a blend of two or more.

Desirably, the olefinic resin has a melt index of generally not more than 1 g/10 minutes, preferably not more than 0.5 g/10 minutes.

The olefinic resin lining material to be used in accordance with this invention may contain, as required, a coloring pigment (such as titanium dioxide and carbon black), an extender pigment (such as calcium carbonate, barium sulfate, and clay), a reinforcing agent (such as glass fibers, asbestos, and glass flakes), and other additives (for example, dispersing aids such as silane coupling agents, ultraviolet absorbers and antioxidants), in addition to the olefinic resin. Inclusion of these additives can lead to various effects such as coloration of the olefinic resin lining material, improvement of its mechanical, chemical and electrical properties, increasing of its durability, and reduction of its cost.

In melt-adhering the olefinic resin lining material under heat to the surface of the multilayer coated film, the olefinic resin lining material can be applied in various forms depending upon the method of lining. For example, it can be applied to the surface of a substrate in various forms such as a powder, small pellets, tapes, films and sheets. The method of applying the olefinic resin lining material differs depending upon the shape or heat capacity of the metallic substrate on which to form a multilayer coated film, the scale of production, etc. For example, there can be used an extrusion-coating method using a crosshead tubing die or T-die which method is used generally in polyethylene coating, a powder melt-adhering method such as a fluidized bed coating method, a powder spraying method, an electrostatic powder coating method, and a powder flame spray coating method. The extrusion-coating method is advantageous when the metallic substrate to be lined is of a simple shape such as a cylinder, hollow cylinder or flat plate. The powder melt-adhering methods are advantageous when the shape of the substrate is complex or the substrate is small in size.

The thickness of the olefinic resin lining layer formed integrally with the surface layer portion of the multilayer coated film differs depending upon the uses of the metallic substrate coated, the environment in which the coated metallic substrate is to be used, its required service life, etc. Usually, it may be 0.5 mm to 5 mm.

According to the process of this invention describes hereinabove, there is produced a multilayer coated film which is composed of an under layer of a cured epoxy resin coating and a surface layer of a thermoplastic olefinic resin coating and has excellent adhesion to a metallic substrate and excellent interlayer adhesion between the layers, and then an olefinic resin lining material is heat-bonded to the olefinic resin surface layer. The process of this invention makes it possible to easily form an olefinic resin coated film of a very large thickness having excellent adhesion to a metallic substrate.

The following examples illustrate the present invention more specifically.

PREPARATION OF MULTILAYER FILM-FORMING COATING COMPOSITIONS

[Coating composition A]

Solid powder (a-1)

Thirty-five parts of polyethylene having a median particle diameter of 20 microns obtained by chemically pulverizing low-density polyethylene having a melt index of 20 g/10 minutes and a density of 0.920.

Solid powder (b-1)

Five parts of modified polyethylene powder having a median particle diameter of 21 microns obtained by chemically pulverizing acrylic acid-grafted low-density polyethylene having a melt index of 4 g/10 minutes, a density of 0.930 and an acid value of 60.

Resinous material (c-1)

Seventy-five parts of an enamel obtained by dispersing 100 parts of bisphenol A-type epoxy resin (Epikote #1004, a trademark for a product of Shell Chemical Co.) having a number average molecular weight of about 1,400 and an epoxy equivalent of about 900, 4 parts of adipic acid dihydrazide and 20 parts of red iron oxide in 40 parts of ethylene glycol monoethyl ether (to be abbreviated ethyl Cellosolve) and 20 parts of toluene for 24 hours in a ball mill.

The above ingredients (a-1), (b-1) and (c-1) were well mixed and dispersed together with 26 parts of methyl isobutyl ketone and 13 parts of toluene by means of a Disper to obtain a multilayer film-forming coating composition A as a partial slurry.

[Coating composition B]

Solid powder (a-2)

Thirty-five parts of polyolefin powder having a median particle diameter of 40 microns which was obtained by melt-kneading 85 parts of polypropylene having a melt index of 7.0 g/10 minutes and a density of 0.91, 15 parts of an ethylene/α-olefin copolymer elastomer (Toughmer P-0180 a product of Mitsui Petrochemical Co., Ltd.) having a melt index of 5.0 g/10 minutes and a density of 0.88 and 10 parts of carbon black in a twinscrew extruder.

Solid powder (b-2)

Two parts of a modified polyethylene powder having a medium particle diameter of 45 microns which was obtained by refrigerating and pulverizing an adhesive resin (Duramine C-1552, a product of Mitsui Polychemical Co. Ltd.; having a melt index of 3.0/10 minutes, a density of 0.96 and a melting point of 71° C.) which was produced by grafting an unsaturated acid to a partially saponified ethylene/vinyl acetate copolymer.

Resinous material (c-2)

Thirty-seven parts of a powder having an average particle diameter of 30 microns which was obtained by uniformly pulverizing and mixing 100 parts of bisphenol A-type epoxy resin having an epoxy equivalent of about 1,800 and a melting point of about 115° C. (Araldite 7097, a trademark for a product of Ciba Limited), 20 parts of baryta, 15 parts of zinc chromate, 8 parts of carbon black and 5.5 parts of 2,6-xylenyl biguanide in a Henschel mixer, adding 100 parts of methyl ethyl ketone, then dispersing the mixture in a ball mill for 18 hours, and finally spray-drying the resulting enamel at 80° C.

The above ingredients (a-2), (b-2) and (c-2) were well mixed by a Henschel mixer to form a multilayer film-forming powder coating composition B.

[Coating composition C]

Solid powder (a-3)

Thirty-three parts of polyethylene powder having a median particle diameter of 15 microns obtained by chemically pulverizing medium-density polyethylene having a melt index of 1.5 g/10 minutes and a density of 0.944.

Solid powder (b-3)

Three parts of a powder having a median particle diameter of 40 microns which was obtained by refrigerating and pulverizing an ethylene/vinyl acetate copolymer resin (EVAFLEX #360, a product of Mitsui Polychemical Co., Ltd.) having a melt index of 2 g/10 minutes and an ethylene unit content of 75%.

Resinous material (c-3)

Sixty-four parts of a powder obtained by mixing 50 parts of a bisphenol A-type epoxy resin (Epikote #1002, a product of Shell Chemical Co.) having a number average molecular weight of 1,000 and an epoxy equivalent of 650, 50 parts of bisphenol A-type epoxy resin (Epikote 1004, a product of Shell Chemical Co.,) having a number average molecular weight of 1,400 and an epoxy equivalent of 900, 4 parts of dicyandiamide, 10 parts of red iron oxide and 5 parts of titanium white in a twin-screw extruder at 100° C., pulverizing the mixture by an atomizer together with dry ice, and sieving the powder with a 250-mesh screen to remove coarse particles.

The above ingredients (a-3), (b-3) and (c-3) were dispersed in 120 parts of a mixed poor solvent consisting of 40 parts of dimethylcyclohexane, 55 parts of an aliphatic mixed solvent (Swasol N-1000, a product of Maruzen Oil Co., Ltd.) and 5 parts of xylene to form a multilayer film-forming coating composition C as a complete slurry.

EXAMPLE 1

The coating composition A was air-spray coated on a steel plate (3.2×150×300 mm) cleaned by sand blasting, and set at room temperature. The coated film was then baked by a hot air oven at 200° C. for 20 minutes to form a multilayer coated film having a thickness of 120 microns. Subsequently, while the surface portion of the multilayer film was still in the molten state, high-density polyethylene (melt index 0.25 g/10 minutes, density 0.947) heat-melted at 230° C. was extrusion-coated to a thickness of 2 mm onto the surface of the multilayer coated film using a single-screw extruder equipped with a T-die. The coated steel plate was immediately cooled with cooling water to form a test specimen for testing the olefinic resin lining.

EXAMPLE 2

The same sand-blasted steel plate as used in Example 1 was pre-heated to 180° C., and dipped in a fluidized layer of the coating composition B, and then baked by a hot air oven at 200° C. for 15 minutes to form a multilayer coated film having a thickness of 150 microns. The coated plate was pre-heated to 280° C. by electromagnetic induction heating, and immediately then dipped in a fluidized layer of polyethylene powder (melt index of 1 g/10 minutes, density of 0.925, and median particle diameter of 75 mesh), and heated for 5 minutes at a surface temperature of 220° C. by using an infrared oven to form a coating having a thickness of 1.5 mm. The coated steel plate was cooled in the air to obtain a test specimen of the olefinic resin lining.

EXAMPLE 3

The coating composition C was applied by a doctor-blade to the same sand-blasted steel plate as used in Example 1, set at room temperature, and baked at 220° C. for 12 minutes to form a multilayer coated film having a thickness of 175 microns. The coated steel plate was pre-heated by an infrared oven so that the surface temperature of the coated film reached 220° C., and a sheet of an ethylene vinyl acetate resin (melt index 1.7 g/10 minutes, density 0.93 vinyl acetate content 8%, thickness 3 mm) was laminated onto the multilayer coated film using a rubber roll. The laminated steel plate was heated at 240° C. for 1 minute, and then cooled with water to form a test specimen of the olefinic resin lining.

EXAMPLE 4

A treating solution was prepared by dissolving 1% of triphenyl benzyl chloride phosphonium (special reagent grade; a product of Wake Pure Chemical Industry Co., Ltd.) in a mixed solvent consisting of 90 parts of water and 10 parts of isopropanol. The treating solution was spray-coated on the surface of the same sand-blasted steel plate as used in Example 1, and dried at 80° C. for 5 minutes.

Then, the steel plate was further coated in the same way as in Example 1 to prepare a test specimen of the olefinic resin lining.

EXAMPLE 5

A 0.5% aqueous solution of trimethyl-2-bromo-ethyl ammonium bromide (special reagent grade, a product of Wako Pure Chemical Industry Co., Ltd.) was prepared, and used to surface-treat the same sand-blasted steel plate as in Example 1 by a dipping method. The treated steel plate was dried at room temperature for 10 minutes, and then coated in the same way as in Example 2 to form a test specimen of the olefinic resin lining.

Comparative Example 1

Twenty parts of a styrene/butadiene block copolymer (Toughprene A, a product of Asahi Chemical Industry Co., Ltd.) and 20 parts of straight asphalt were kneaded by a hot roll to form a master batch. Then, to the master batch were added 40 parts of 20/30 blown asphalt, 40 parts of 30/40 blown asphalt, and 10 parts of ester gum (hydrogenated rosin ester), and they were kneaded by a Banbury mixer while heating the mixture at 130° C. The mixture was then stirred at 180° C. by a Disper until it was uniformly melted to obtain a tackifier composition.

The same sand-blasted steel plate as in Example 1 was pre-heated to 100° C. and the resulting tackifier composition melted at 150° C. was blade-coated on the steel plate to a thickness of 500 microns, and immediately then, a polyethylene sheet having a thickness of 2 mm (melt index 0.25 g/10 minutes; density 0.947) was bonded to the coated surface of the steel plate and pressed by a rubber roll. The resulting steel plate was maintained at 100° C. for 10 minutes, and then cooled in the air to prepare a test specimen for comparison.

Comparative Example 2

The same sand-blasted steel plate as in Example 1 was spray-coated only with the epoxy enamel [resinous material (c-1)] in the coating composition A. The coated film was set at room temperature and then baked at 200° C. for 20 minutes to form an epoxy primer layer having a thickness of 55 microns. Then, acrylic acid-grafted low-density polyethylene having a melt index of 4 g/10 minutes and a density of 0.930 and high-density polyethylene having a melt index of 0.25 g/10 minutes and a density of 0.947 were extruded from separate extruders at a temperature of 180° C. and 230° C. respectively and introduced into a single T-die to form a multilayer sheet-like extrudate with the individual layers measuring 100 microns and 2 mm, respectively, in thickness. Immediately then, the multilayer sheet was laminated to the epoxy primer layer of the coated steel plate (pre-heated to 180° C. by electromagnetic induction heating) so that the acrylic acid-grafted polyethylene layer closely adhered to the epoxy primer layer. The resulting steel plate was then cooled with cooling water to form a test specimen for comparison.

Comparative Example 3

A test specimen of the olefinic resin lining was prepared in the same way as in Example 1 except that instead of the coating composition A, a multilayer film-forming coating composition as a partial slurry obtained by removing the solid powder (b-1) from the coating composition A was used.

The test specimens obtained in the above Examples and Comparative Examples were tested in accordance with the following test methods. The results are shown in Table 1.

Testing Items and Methods

Adhesion strength

The polyolefin resin lining layer was cut to a width of 10 mm. A part of it was peeled, bended at 180° and pulled at a rate of 10 mm/min. to measure its adhesion strength (kg/cm).

Slide-down resistance

The excess of the coating material at the edge portion of the test specimen was shaved off, and the test specimen was allowed to stand for 3 hours in a box at 90° C. with its longitudinal direction being at an angle of 70°. The sliding width (mm) of the polyolefin resin lining material was measured.

Shrinking length

The excess of the coating material at the edge portion of the test specimen was shaved off, maintained horizontal for 60 minutes in a furnace at 80° C., then allowed to cool to room temperature outside the furnace, and again heated. This heat cycle test was repeated 10 times, and the shrinkage of the polyolefin resin lining material (in the longitudinal direction of the sample specimen) was measured.

Impact strength

Using a Gardener impact tester, the maximum impact force (kg-m) at which no crack or peel occurred in the epoxy resin layer and the polyolefin resin lining layer was measured.

Cathode peeling resistance

The edge portion and back surface of the test specimen was coated with a tar epoxy type paint and dried to hide these parts. Then, a hole having a diameter of 3.2 mm and reaching the steel sheet substrate was drilled in the olefinic resin lining layer. The specimen was then dipped in a 3% aqueous solution of sodium chloride. Then, using the specimen as a cathode and a platinum anode, a direct-current voltage of 6 V was applied across the two electrodes. After passing the current for 30 days, the diameter of that part of the coated film which was peeled from the steel plate substrate by a knife creep was measured.

Corrosion resistance

A cut, 1 mm in width, reaching the steel sheet substrate was provided in the test specimen, and a 5% aqueous solution of sodium chloride was sprayed onto the specimen for 1,000 hours by a salt spray tester. The width (mm) of a corroded part of the substrate from the cut portion was measured.

The results shown in the following table demonstrate that the polyolefin resin lining formed by the process of this invention has high adhesion changing little with temperature, good low-temperature impact resistance, and excellent corrosion resistance.

TABLE 1

| Testing items and methods | Examples and Comparative Examples | | | | | | | |
|---|---|---|---|---|---|---|---|---|
| | Example | | | | | Comparative Example | | |
| | 1 | 2 | 3 | 4 | 5 | 1 | 2 | 3 |
| Adhesion strength +20° C./+40° C. (kg/cm) | 11/9.5 | 10.5/8.5 | 8.0/6.5 | 16.5/12 | 21/17 | 3.5/1.0 | 6.0/3.5 | 2.0/1.5 |
| Slide-down resistance (mm) | 0 | 0 | 0 | 0 | 0 | 83 | 2 | 5 |
| Shrinking length (mm) | 0 | 0 | 0 | 0 | 0 | 2.0 | 0.2 | 2.0 |
| Impact strength +20° C./−20° C. (kg-m) | 2.3/3.0 | 2.0/2.5 | 3.2/4.5 | 2.5/3.2 | 2.2/2.8 | 1.5/0.1 | 2.1/2.8 | 2.2/2.8 |
| Cathode peeling resistance ($\phi$mm) | 10.5 | 9.0 | 12.5 | 6.2 | 5.5 | 15 | 35 | 11.7 |
| Corrosion resistance (mm) | 0.7 | 0.5 | 0.8 | 0.5 | 0.3 | 2.2 | 1.4 | 1.5 |

What we claim is:

1. A process for forming an olefinic resin film on a metal substrate, which comprises
   [A] forming a multilayer coated film consisting of an olefinic resin film as a surface layer portion and a cured epoxy resin film as an under layer portion on a metallic substrate by a single coating operation using a multilayer film-forming coating composition comprising as main resinous components
   (a) a solid powder containing an olefinic resin having a melt index of 0.3 to 80 g/10 minutes,
   (b) a solid powder containing a polar group-containing modified olefinic resin having a melt index of 0.3 to 80 g/10 minutes, and
   (c) a film-forming resinous material comprising an epoxy resin having a number average molecular weight of about 350 to about 4,000 and an epoxy equivalent of 150 to 3,800 and a curing agent therefor, and
   [B] then heat-bonding an olefinic resin lining material to the olefinic resin surface layer of the multilayer coated film.

2. The process of claim 1 wherein the olefinic resin in the solid powder (a) has a melt index of 1.5 to 60 g/10 minutes.

3. The process of claim 1 wherein the olefinic resin in the solid powder (a) is polyethylene, polypropylene, or an ethylene/propylene copolymer.

4. The process of claim 1 wherein the olefinic resin in the solid powder (a) is polyethylene.

5. The process of claim 1 wherein the solid powder (a) contains up to 150% by weight, based on the weight of the olefinic resin, of a coloring agent and/or a filler.

6. The process of claim 1 wherein the solid powder (a) has an average particle diameter of not more than 74 microns.

7. The process of claim 1 wherein the polar group in the polar group-containing modified olefinic resin is an atom or atomic grouping consisting of at least one hetero atom selected from the group consisting of oxygen, nitrogen, sulfur and halogen atoms.

8. The process of claim 7 wherein the atomic grouping is a hydroxyl, oxo, carbonyl, carboxyl, carboxylate ester, carboxylic anhydride, sulfonyl, sulfo, nitrile or amide group.

9. The process of claim 1 wherein the amount of the polar group contained in the polar group-containing modified olefinic resin is 0.2 to 15% by weight based on the weight of the resin.

10. The process of claim 1 wherein the polar group-containing olefinic resin is a copolymer of at least one olefin and at least one copolymerizable polar group-containing vinyl monomer, a graft copolymer of an olefinic resin having grafted thereto a polar group-containing vinyl monomer, or a halogenated, chlorosulfonated, sulfonated or ozone-oxidized product of an olefinic resin.

11. The process of claim 1 wherein the polar group-containing modified olefinic resin is ethylene/vinyl acetate copolymer, ethylene/acrylic acid copolymer, fluorinated polyethylene, chlorinated polyethylene, chlorosulfonated polyethylene, sulfonated polyethylene, ozone-oxidized polyethylene, maleic anhydride-grafted polyethylene, acrylic acid-grafted polyethylene, acrylonitrile-grafted polyethylene, or acrylamide-grafted polyethylene.

12. The process of claim 1 wherein the polar group-containing modified olefinic resin has a melt index of 1.5 to 60 g/10 minutes.

13. The process of claim 1 wherein the solid powder (b) contains up to 150% by weight, based on the weight of the polar group-containing modified olefinic resin, of a coloring agent and/or a filler.

14. The process of claim 1 wherein the solid powder (b) has an average particle diameter of not more than 74 microns.

15. The process of claim 1 wherein the epoxy resin has an average molecular weight of about 900 to about 3,000.

16. The process of claim 1 wherein the epoxy resin has an epoxy equivalent in the range of 450 to 2,100.

17. The process of claim 1 wherein the epoxy resin is selected from the group consisting of polyphenol-/epihalohydrin condensate-type epoxy resins, phenol/-formaldehyde condensate-type epoxy resins, and polymerized fatty acid-type epoxy resins.

18. The process of claim 17 wherein the epoxy resin is a polyphenol/epihalohydrin condensate-type epoxy resin.

19. The process of claim 1 wherein the film-forming resin material contains at least 0.7 equivalent, per epoxy group in the epoxy resin, of a curing agent.

20. The process of claim 1 wherein the multilayer film-forming coating composition is in the form of a powder, a complete slurry, or a partial slurry.

21. The process of claim 1 wherein the sum of the true volumes of the solid powder (a) and the solid powder (b) is 5 to 300% based on the true volume of the resinous material (c).

22. The process of claim 21 wherein the sum of the true volumes of the solid powder (a) and the solid powder (b) is 20 to 200% based on the true volume of the resinous material (c).

23. The process of claim 1 wherein the true volume of the solid powder (b) is 1 to 30% based on the true volume of the solid powder (a).

24. The process of claim 23 wherein the true volume of the solid powder (b) is 3 to 20% based on the true volume of the solid powder (a).

25. The process of claim 1 wherein the multilayer film-forming coating composition contains 50 to 300 parts by weight of a dispersing medium per 100 parts by weight of the solid powder (a), the solid powder (b) and the resinous material (c) combined.

26. The process of claim 1 wherein the multilayer coated film has a thickness of 30 to 250 microns.

27. The process of claim 1 wherein the multilayer film-forming coating composition is coated on the surface of the metallic substrate and baked at a temperature of about 150° to about 250° C.

28. The process of claim 1 wherein the surface of the metallic substrate is coated in advance with a solution containing at least one onium compound.

29. The process of claim 28 wherein the onium compound is selected from compounds of formulae (I) and (II) below,

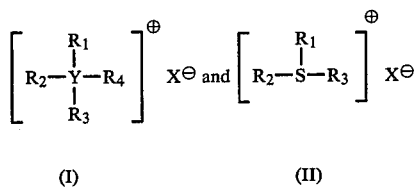

wherein Y represents a nitrogen, phosphorus or arsenic atom, $R_1$, $R_2$, $R_3$ and $R_4$ are identical or different and each represents a hydrogen atom or an organic group having not more than 8 carbon atoms, and $X^\ominus$ represents an anion.

30. The process of claim 29 wherein said organic group is a hydrocarbon group having not more than 8 carbon atoms and containing a hetero atom selected from the group consisting of hydroxylic and etheric oxygen atoms and halogen atoms.

31. The process of claim 30 wherein said organic group is selected from the class consisting of alkyl groups having 1 to 6 carbon atoms, cycloalkyl groups having 5 to 8 carbon atoms, cycloalkyl-alkyl groups having 5 to 8 carbon atoms, a phenyl group, a tolyl group, a xylyl group, a benzyl group, hydroxyalkyl groups having 1 to 8 carbon atoms, alkoxyalkyl groups having 2 to 8 carbon atoms and haloalkyl groups having 1 to 6 carbon atoms.

32. The process of claim 31 wherein said organic group is selected from the class consisting of alkyl groups having 1 to 4 carbon atoms, hydroxyalkyl groups having 1 to 4 carbon atoms, alkoxyalkyl groups having 2 to 4 carbon atoms, haloalkyl groups having 1 to 4 carbon atoms, a phenyl group and a benzyl group.

33. The process of claim 29 wherein said anion $X^\ominus$ is selected from the group consisting of $PO_4^{3\ominus}$, $HPO_4^{2\ominus}$, $H_2PO_4^\ominus$, $SO_4^{2\ominus}$, $NO_3^\ominus$, $OH^\ominus$, $CH_3COO^\ominus$, $C_2H_5COO^\ominus$, $CH_3CH(OH)COO^\ominus$ and $C_6H_5SO_3^\ominus$.

34. The process of claim 33 wherein said anion is a halogen ion.

35. The process of claim 29 wherein said onium compound is an ammonium or phosphonium compound of the following formula

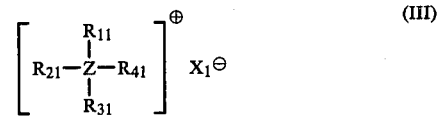

wherein Z represents a nitrogen or phosphorus atom, $R_{11}$, $R_{21}$, $R_{31}$ and $R_{41}$ are identical or different and each represents a lower alkyl group having 1 to 4 carbon atoms, a hydroxyalkyl group having 1 to 4 carbon atoms, an alkoxyalkyl group having 2 to 4 carbon atoms, a haloalkyl group having 1 to 4 carbon atoms, a phenyl group or a benzyl group, and $X_1^\ominus$ represents a halogen ion.

36. The process of claim 28 wherein said solution contains said onium compound in a concentration of 0.01 to 30% by weight.

37. The process of claim 28 wherein said treatment is effected by coating the surface of said substrate with said solution.

38. The process of claim 37 wherein the onium compound is coated at a rate of about 0.001 to about 1.5 g/m².

39. The process of claim 28 wherein the solution contains a mono-, di- or tri-(hydroxy lower alkyl)amine or phosphoric acid.

40. The process of claim 1 wherein the olefinic resin lining material is polyethylene, polypropylene, ethylene/propylene copolymer, ethylene/vinyl acetate copolymer, or metallic ion-crosslinked ethylene/acrylic acid copolymer.

41. The process of claim 1 wherein the olefinic resin lining material is polyethylene.

42. The process of claim 1 wherein the olefinic resin lining material has a melt index of not more than 1 g/10 minutes.

43. The process of claim 1 wherein the olefinic resin lining material is melt-adhered under heat by an extrusion coating method or by a powder melt-adhering method.

44. The process of claim 1 wherein the olefinic resin lining material has a coating thickness of 0.5 to 5 mm.

45. A metallic article having formed thereon an olefinic resin film by the process of claim 1.

* * * * *